US009754021B2

United States Patent
Byron et al.

(10) Patent No.: US 9,754,021 B2
(45) Date of Patent: *Sep. 5, 2017

(54) METHOD FOR DEDUCING ENTITY RELATIONSHIPS ACROSS CORPORA USING CLUSTER BASED DICTIONARY VOCABULARY LEXICON

(71) Applicant: International Business Machines Corporation, Armonk, NY (US)

(72) Inventors: Donna K. Byron, Petersham, MA (US); Swaminathan Chandrasekaran, Coppell, TX (US); Lakshminarayanan Krishnamurthy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/638,264

(22) Filed: Mar. 4, 2015

(65) Prior Publication Data
US 2016/0092448 A1    Mar. 31, 2016

Related U.S. Application Data

(63) Continuation of application No. 14/498,259, filed on Sep. 26, 2014.

(51) Int. Cl.
*G06F 17/30* (2006.01)
*G06F 17/27* (2006.01)

(52) U.S. Cl.
CPC .... *G06F 17/30684* (2013.01); *G06F 17/2785* (2013.01); *G06F 17/3071* (2013.01); *G06F 17/30424* (2013.01)

(58) Field of Classification Search
CPC ............. G06F 17/3071; G06F 17/2785; G06F 17/30424; G06F 17/30684

(Continued)

(56) References Cited

U.S. PATENT DOCUMENTS 6,826,724 B1 * 11/2004 Shimada ............. G06F 17/2229
707/999.004
8,355,905 B2    1/2013 Fokoue-Nkoutche et al.
(Continued)

FOREIGN PATENT DOCUMENTS

WO    2009086312 A1    7/2009

OTHER PUBLICATIONS

List of IBM Patents or Applications Treated as Related.
(Continued)

*Primary Examiner* — Kris Mackes
*Assistant Examiner* — Tiffany Bui
(74) *Attorney, Agent, or Firm* — Terrile, Cannatti, Chambers & Holland, LLP; Michael Rocco Cannatti

(57) ABSTRACT

An approach is provided for identifying entity relationships based on word classifications extracted from business documents stored in a plurality of corpora. In the approach, performed by an information handling system, a plurality of cluster classifications are identified for the business documents so that entity information from the business documents can be classified or assigned to the cluster classifications, such as by performing natural language processing (NLP) analysis of the business documents. The approach applies semantic analysis to identify and score entity relationships between the entity information classified in the cluster classifications, and based on the scored entity relationships, cluster relationships between the cluster classifications are identified.

6 Claims, 5 Drawing Sheets

(58) Field of Classification Search
USPC .......................................................... 707/739
See application file for complete search history.

(56) References Cited

U.S. PATENT DOCUMENTS

| | | | | |
|---|---|---|---|---|
| 8,442,940 | B1* | 5/2013 | Faletti | G06F 17/2785 704/9 |
| 8,533,211 | B2 | 9/2013 | Dasgupta et al. | |
| 8,589,396 | B2 | 11/2013 | Achtermann et al. | |
| 8,589,413 | B1* | 11/2013 | Mohan | G06F 17/30616 706/46 |
| 8,620,848 | B1 | 12/2013 | Komissarchik et al. | |
| 8,972,376 | B1* | 3/2015 | Gailis | G06F 17/30864 706/12 |
| 2004/0122846 | A1 | 6/2004 | Chess et al. | |
| 2006/0288029 | A1* | 12/2006 | Murakami | G06F 17/30705 |
| 2008/0010274 | A1* | 1/2008 | Carus | G06N 99/005 |
| 2008/0114750 | A1* | 5/2008 | Saxena | G06F 17/30687 |
| 2008/0275694 | A1* | 11/2008 | Varone | G06F 17/2785 704/9 |
| 2009/0144609 | A1* | 6/2009 | Liang | G06F 17/21 715/230 |
| 2010/0228693 | A1* | 9/2010 | Dawson | G06F 17/2705 706/12 |
| 2011/0246181 | A1* | 10/2011 | Liang | G06F 17/2775 704/9 |
| 2013/0073571 | A1 | 3/2013 | Coulet et al. | |
| 2013/0246129 | A1 | 9/2013 | Chandrasekaran et al. | |
| 2013/0268519 | A1 | 10/2013 | Cucerzan et al. | |
| 2014/0201126 | A1* | 7/2014 | Zadeh | G06K 9/627 706/52 |
| 2014/0317147 | A1* | 10/2014 | Wu | G06Q 50/18 707/792 |
| 2015/0095316 | A1* | 4/2015 | Nie | G06F 17/30731 707/722 |

OTHER PUBLICATIONS

R. High, "The Era of Cognitive Systems: An Inside Look at IBM Watson and How it Works," IBM Redbooks, 2012, 1-15.
Yuan et al., "Watson and Healthcare," IBM developerWorks, 2011, pp. 1-9.
IBM, Journal of Research and Development, This is Watson, Introduction and Table of Contents, vol. 56, No. 3/4, May/Jul. 2012, http://ieeexplore.ieee.org/xpl/tocresult.jsp?reload=true &isnumber=6177717, pp. 1-5.

* cited by examiner

METHOD FOR DEDUCING ENTITY RELATIONSHIPS ACROSS CORPORA USING CLUSTER BASED DICTIONARY VOCABULARY LEXICON

This is a continuation of U.S. patent application Ser. No. 14/498,259, entitled "Method For Deducing Entity Relationships Across Corpora Using Cluster Based Dictionary Vocabulary Lexicon," filed Sep. 26, 2014, which is incorporated herein by reference in its entirety.

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). In order to prepare an answer, traditional QA systems use a named entity recognition (NER) process (also known as entity identification, entity chunking and entity extraction) to analyze textual information in a large knowledge database (or "corpus") by locating and classifying elements in the textual information into pre-defined categories, such as the names of persons, organizations, locations, expressions of times, quantities, monetary values, percentages, etc. However, the NER processes used in different industry domains often results in different or conflicting named entity extraction results, depending on the contexts of the different industry domains. For example, the same entity may be identified in different industry domains with the same identifier or with different identifiers, again depending on the contexts of the different industry domains. While certain named entity extraction schemes have been proposed which extract the named entities of a class from a large amount of corpus and into a dictionary for a given industry domain, such schemes are not well suited for contextualizing the recognition named entities extracted from different industry domains. As a result, the existing solutions for efficiently identifying and recognizing entity relationships across different industry domain dictionaries are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to deduce entity relationships across a multiple knowledge databases or corpora using cluster-based dictionary vocabulary lexicon which are weighted or scored. In selected embodiments, the information handling system may be embodied as a question answering (QA) system which receives and answers one or more questions from one or more users. To answer a question, the QA system has access to structured, semi-structured, and/or unstructured content in a plurality of business documents (e.g., billing, customer orders, procedures, dealers, customer correspondence, credit, incidence, service, etc.) that are contained in one or more large knowledge databases (a.k.a., "corpus") from different industry domains. To identify entity relationships in the different industry domains, the QA system identifies two or more different classifications or domains (a.k.a., business silos) for business documents. In addition, the QA system performs natural language processing (NLP) and analysis to the business documents to identify or extract key terms, contexts, and concepts, such as named entities, phrases, and/or terms in the business documents which are stored in one or more domain entity dictionaries. The identified or extracted key terms, contexts, and concepts are then classified or assigned to each of the identified classifications or domains. Within and/or across each identified classification or domain, the QA system applies semantic analysis to extract shallow and/or deep relationships and assign corresponding relationship scores. Applying a normalized weighting algorithm to the relationship scores, the QA system identifies relationships between the terms and concepts of the two or more different classifications or domains. The identified relationships may also be ranked or filtered using a score threshold metric applied at the QA system, thereby evaluating the identified relationships to select those having top ranked scores or that exceed the score threshold metric. In addition, the QA system may construct a model which specifies the relationships between the identified classifications or domains. With the contextual and weight driven mining techniques disclosed herein for dealing with unstructured and semi-structured corpus, entity relationships across disparate knowledge databases or corpora may be efficiently extracted and correlated with minimal human supervision, thereby providing an automated approach for deducing relationships between ambiguous entity descriptions in different corpora.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
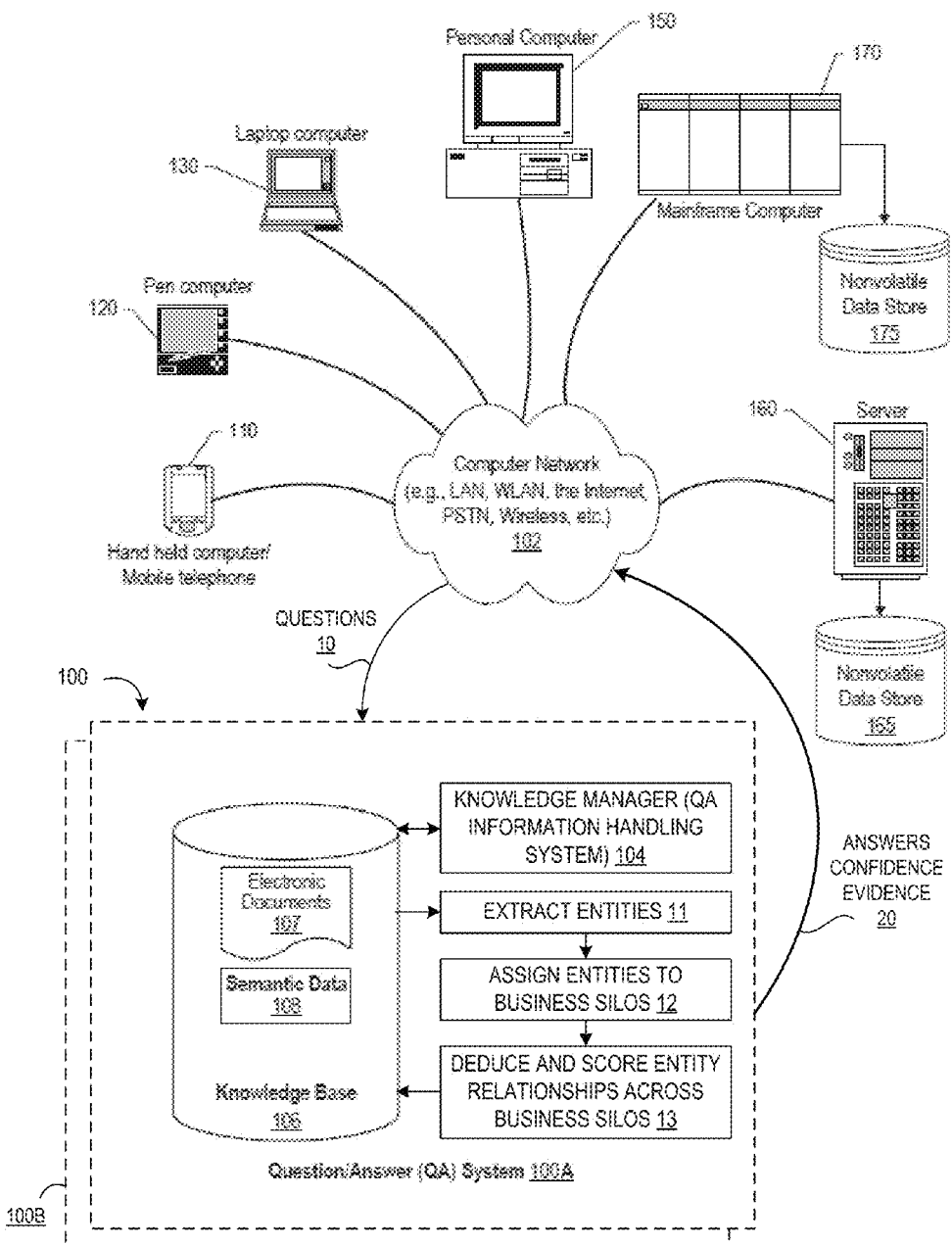
FIG. 1 depicts a network environment that includes a knowledge manager that utilizes a knowledge base.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium for media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, subsystems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 or other data, a content creator 108, content users, and other possible sources of input. In selected embodiments, the knowledge base 106 may include structured, semi-structured, and/or unstructured content in a plurality of business documents (e.g., billing, customer orders, procedures, dealers, customer correspondence, credit, incidence, service, etc.) that are contained in one or more large knowledge databases or corpora from different industry domains. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 104. The document 107 may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In order to answer a submitted question, the QA system 100 has access to the large knowledge database 106 which contains textual information and electronic documents 107 organized in different corpora. To retrieve meaningful information from the knowledge database 106, the knowledge manager 104 may be configured analyze textual information by locating and classifying elements in the textual information into pre-defined categories, such as the names of persons, organizations, locations, expressions of times, quantities, monetary values, percentages, etc. To this end, the knowledge manager 104 may use an entity extraction process 11, such as a named entity recognition (NER) process (also known as entity identification, entity chunking and entity extraction), to locate and classify elements from the textual information into pre-defined categories, such as the names of persons, organizations, locations, expressions of times, quantities, monetary values, percentages, etc. The entity extraction process 11 may use natural language (NL) processing to analyze textual information in the corpora and extract entity information contained therein, such as named entities, phrases, urgent terms, and/or other specified terms. For example, the entity extraction process 11 may use a Natural Language Processing (NLP) routine to identify specified entity information in the corpora, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. The results of the entity extraction process 11 may be processed by the knowledge manager 104 with an assignment process 12 which assigns the extracted entity information to one or more business silos or clusters (e.g., an "order" silo, "inquiry" silo, or "billing" silo). Once the different business silos or clusters are populated with the extracted entity information, the knowledge manager 104 may be configured to perform a relationship discovery and scoring process 13 on the contents of the different silos or clusters to deduce entity relationships across the different silos or clusters using a variety of shallow and deep relationship extraction algorithms, and then score the identified relationships. The identified relationships may be further processed by the knowledge manager 104 to construct a model of silo or cluster relationship information 109 that is stored in the knowledge database 106 for use by the QA system 100 when answering questions 10.

In particular, a received question 10 may be processed by the IBM Watson™ QA system 100 which performs deep analysis on the language of the input question 10 and the language used in each of the portions of the corpus of data found during the application of the queries, including the cluster relationship information 109, using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
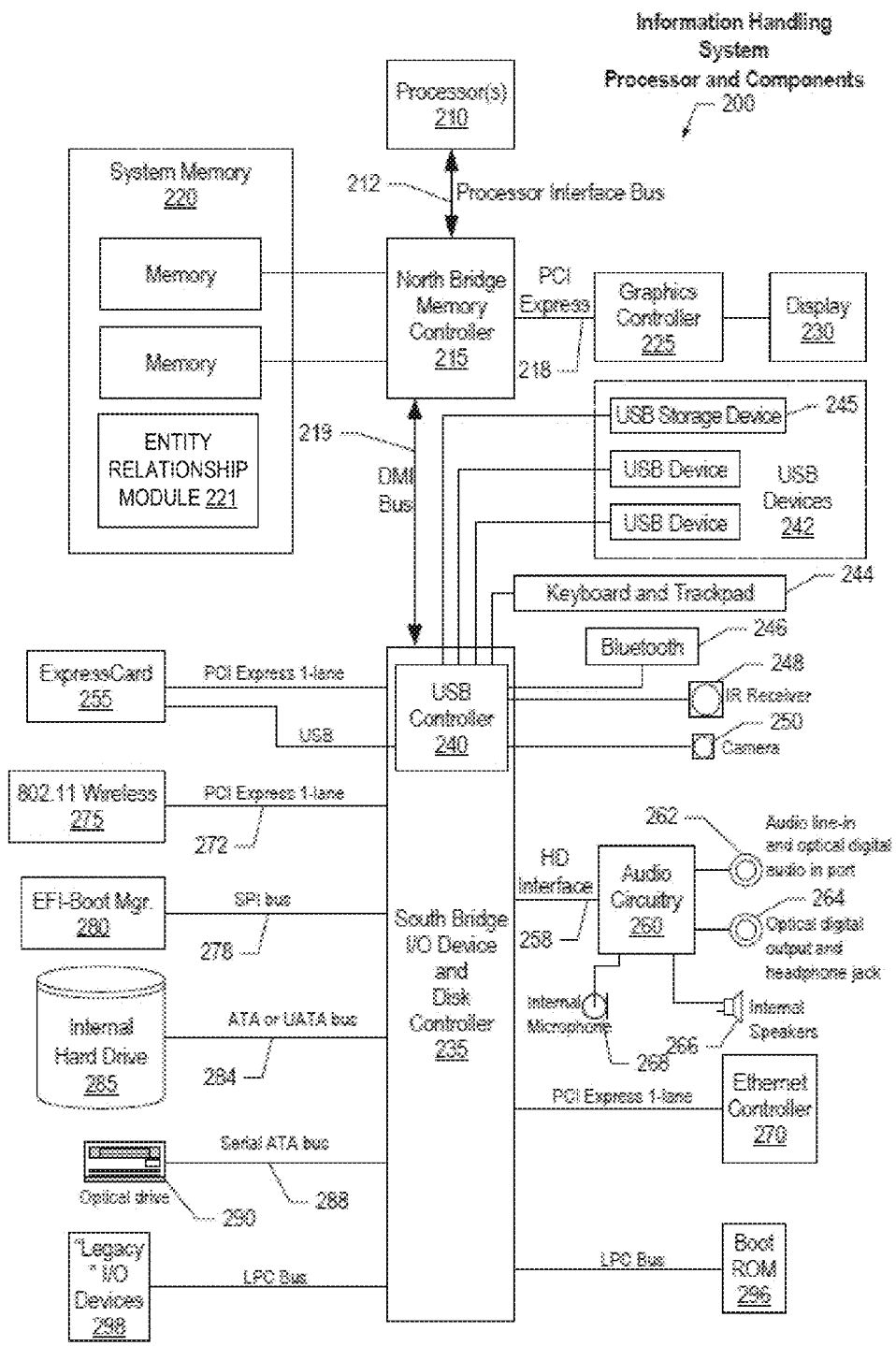
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including an entity relationship module 221 which may be invoked to deduce and score entity relationships across disparate corpora. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
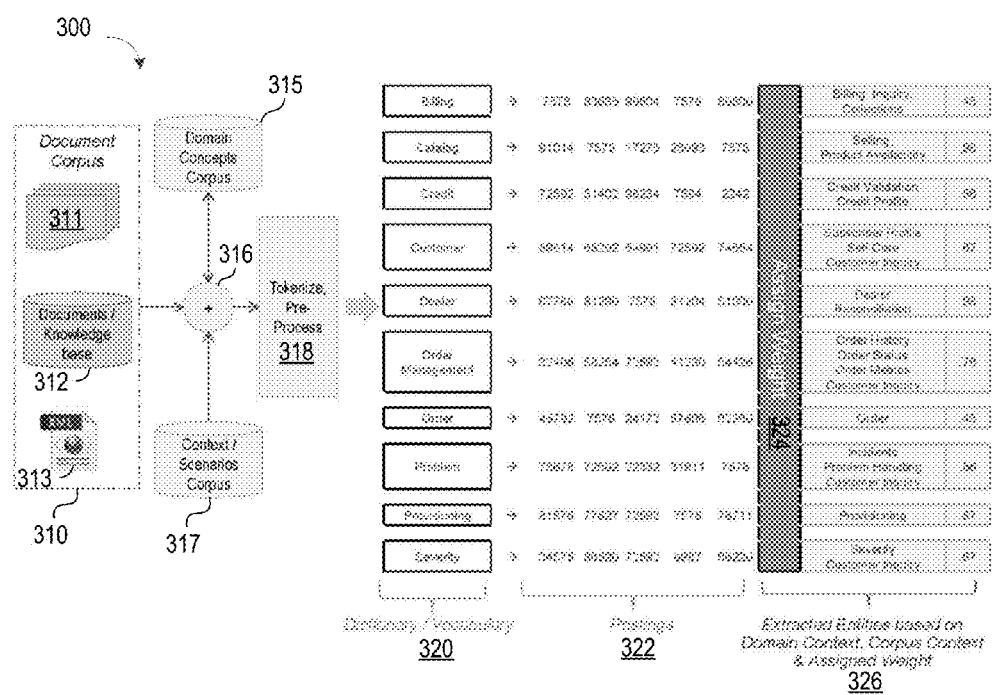
FIG. 3 is a component diagram depicting various system components for assigning weights to dictionary vocabulary lexicon based on domain dictionary corpus and context dictionary corpus.
Figure 4:
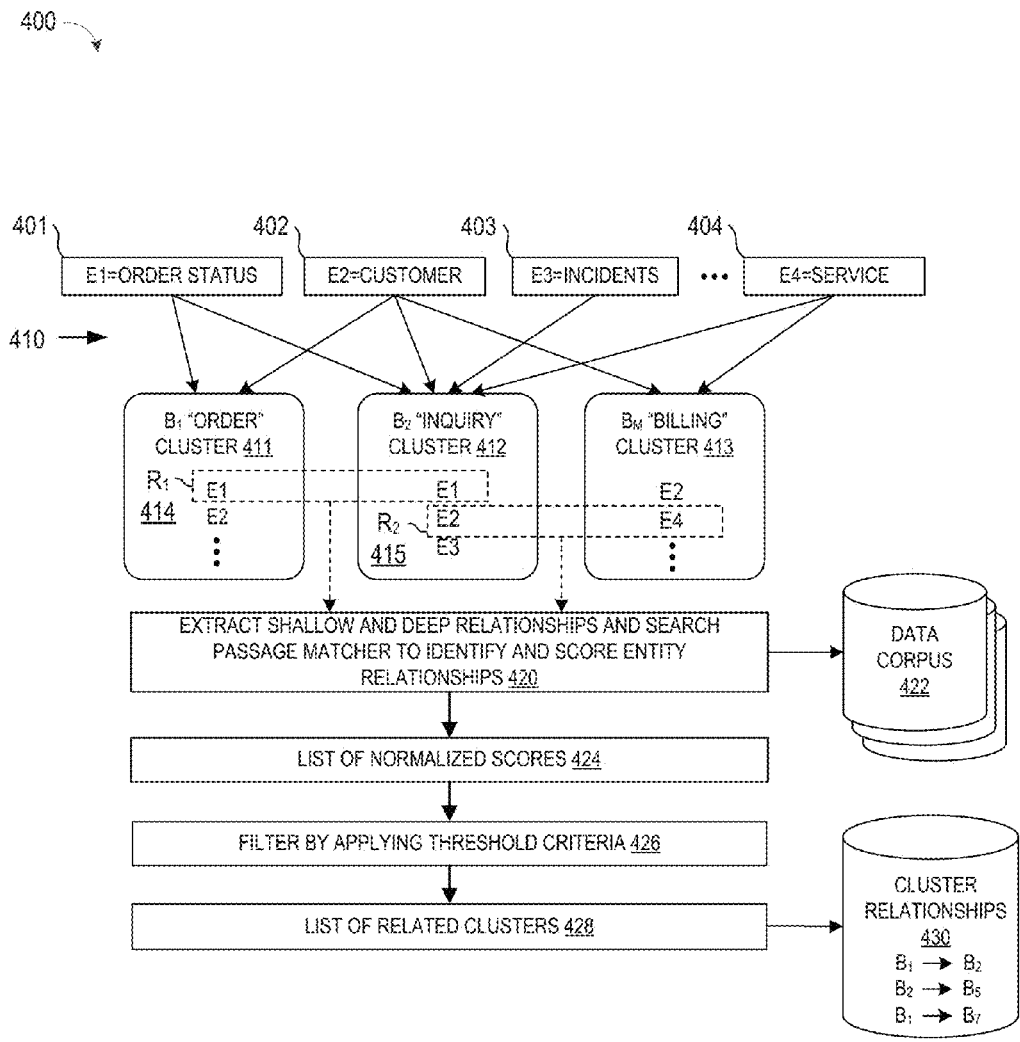
FIG. 4 is a component diagram depicting various system components for extracting entity relationship information across corpora.
Figure 5:
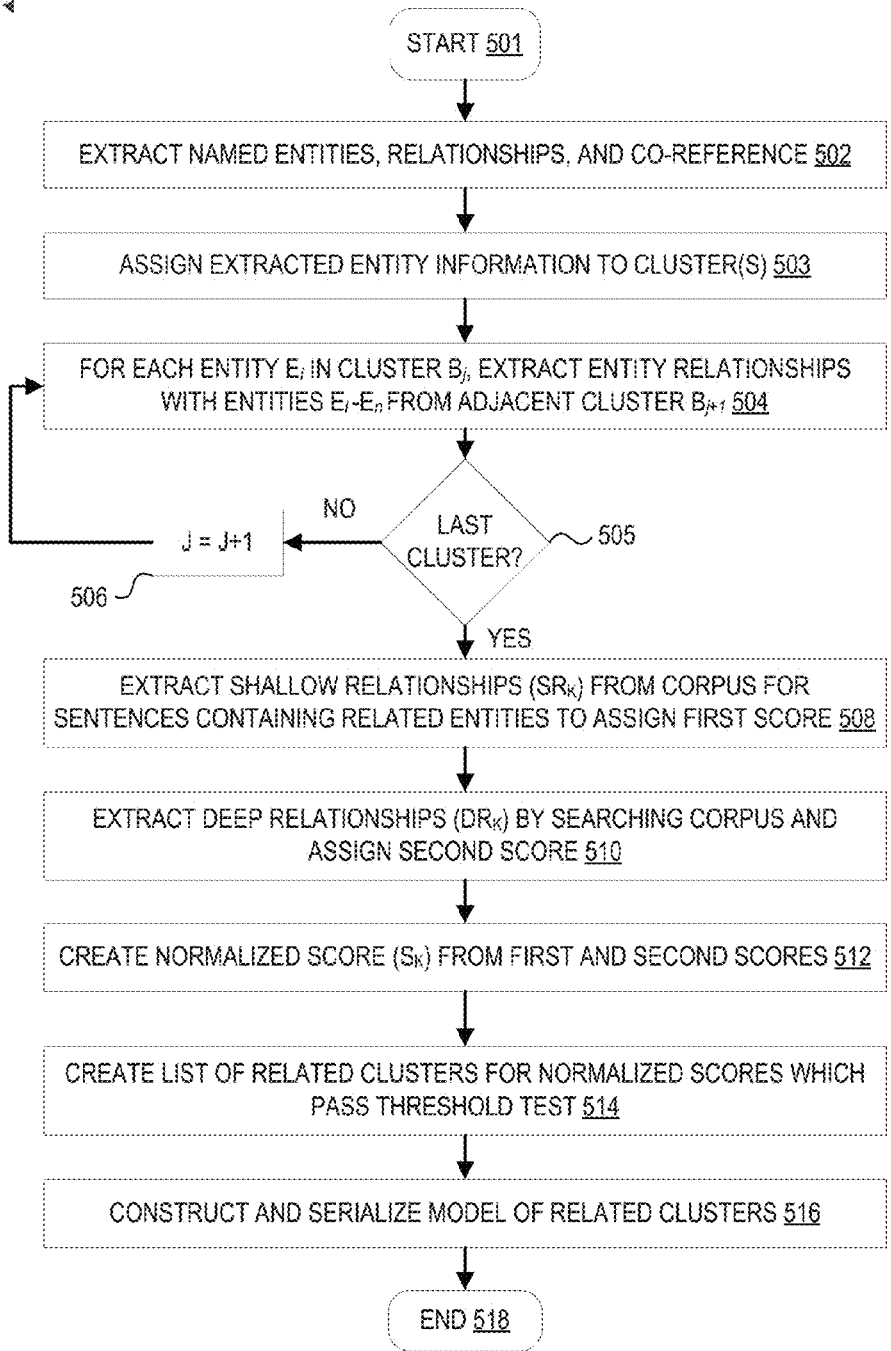
FIG. 5 illustrates a simplified flow chart showing the logic for deducing entity relationships across different knowledge databases or corpora using cluster-based dictionary vocabulary lexicon which are weighted or scored.

FIGS. 3-5 depict an approach that can be executed on an information handling system to identify entity relationships across disparate corpora for use in answering questions 10 being presented to a knowledge management system, such as QA system 100 shown in FIG. 1. This approach can be included within the QA system 100 or provided as a separate entity relationship identification system, method, or module. Wherever implemented, the disclosed entity relationship identification scheme mines unstructured and semi-structured documents and text from a plurality of knowledge bases or corpora for information about elated entities to obtain an improved understanding of the entirety of the corpora to assist with generating an answer to a presented question. The mined information includes the presence of any key terms, phrases, or named entities in the question which may be extracted from different databases by using NLP techniques. In addition, the entity relationship identification scheme assigns extracted entity information to one or more specific business silos or clusters, and then applies semantic analysis to extract and score shallow and/or deep relationships between the business silos or clusters. Based on the scored or ranked relationships, a model may be constructed which specifies relationships between individual entities referenced or contained within the cluster/silo information.

To provide additional details for an improved understanding of selected embodiments of the present disclosure, reference is now made to FIG. 3 which depicts a component diagram 300 of various system components for assigning weights to dictionary vocabulary lexicon based on domain dictionary corpus and context dictionary corpus. The system components shown in FIG. 3 may be used to discover entity relationships in the knowledge corpora 106 that are used to answer a question request (e.g., question 10) presented for processing to a cognitive system 100, such as an IBM Watson™ QA system or other natural language question answering system shown in FIG. 1.

In selected embodiments, the system component diagram 300 may be used to discover entity relationships across different business data silos or sub-domains that exist within a business entity or domain. Example sub-domains may include order fulfillment, billing, wellness care, service assurance, warehouse management, accounting, technical support, etc. With such sub-domains, it will be appreciated that each sub-domain may develop its own terminology and data models, reflected in both structured and unstructured information stores. For example, a term or entity called "jeopardy" in the "order fulfillment" sub-domain is the process of resolving a failed order, but in the "accounting" and "wellness" sub-domains, the term means something completely different. Since it is not always possible to impose a common and normalized ontology across business silos to enforce consistent terminology or modeling, the result is that inconsistencies can develop across communities which hamper efforts to glean larger-scale analytic or predictive conclusions. Even when an entity and associated attributes are the same across business silos, such as a "Customer" and associated entity such as "account or ID number," the data models may not use foreign key relationships to record this equivalence.

Rather than extracting relationship information from an aggregation of all data across all of the silos to form a corpus that represents the business in its entirety into one corpus, the system component diagram 300 may be used to separate the structured data analysis of the business documents in each document corpus 310 into a two-phase process which finds relationships within each sub-domain first, and then subsequently finding linkages across sub-domains to create a more precise model. As illustrated, each document corpus 310 may include a plurality of electronic documents 311, a document or knowledge database 312, one or more webpages 313, and the like. Information from each document in the corpus 310 is processed at a knowledge manager or processor 316 using a domain concepts corpus 315 and a context or scenarios corpus 317 to calculate and assign a weight for the associated context for the each record in the index. As a preliminary step in specifying weights, the pre-processing module 318 extracts key features and terms from each document in the source corpus 310 for storage in the vocabulary dictionary 320. In extracting the terms (e.g., Billing, Catalog, Credit, Customer, Dealer, Order Management, Order, Problem, Provisioning, Severity), the pre-processing module 318 may also assemble a postings list that records in which document each term appears. For example, the postings list for the "Billing" terms include documents 7578, 83635, 99604, 7578, 89800. All posting lists taken together form the "postings" 322.

For each extracted term in the dictionary 320, the knowledge manager/processor 316 and/or pre-processing module 318 uses information from the domain concepts corpus 315 to match and associate the domain under which the term would fit. In addition, the knowledge manager/processor 316 and/or pre-processing module 318 uses information from the context/scenarios corpus 317 to match and associate the contexts) or scenarios(s) in which the term will be needed.

At the weight assignment module 324, the weight for each term may be computed using any desired weighting algorithm. For example, the weight for a term T in the extracted dictionary 320 may be computed based on the term D in the domain concepts corpus 315 and from the term C in the context/scenarios corpus 317 using the equation:

$$\text{Computed Weight} = (P(T) \times P(D|T))/(P(D)) + (P(T) \times P(C|T))/(P(C)).$$

In addition, the weight assignment module 324 may compute normalized weight values=Computed Weight*(Total # of documents in Corpus that were processed)/(Total # of documents in Corpus that were processed+Total # of documents in Corpus that were rejected). Based on these computations, one or more related entities and corresponding assigned weights 326 are extracted for each term in the dictionary 320. For example, the domain concepts corpus 315 and context/scenarios corpus 317 are used to extract the "Billing Inquiry" and "Collections" entities as being related to the "Billing" term in the dictionary 320 with a normalized weight of 0.45.

By using the domain concepts corpus 315 and context/scenarios corpus 317 in a two-phase process to extract and score related entity information 326, relationships within a sub-domain may be identified before finding linkages across sub-domains, thereby creating a model that reveals linkages or relationships between entities across sub-domains that are not expressed in any business documents or structured data models. As a result, lexical mappings across business sub-domains can be produced as a translation resource that is generally useful for any data modeling or unstructured data analysis activity. This enables the discovery of hidden threads between the same real-world entities that are shuttled across myriad business activities and flows that are managed by multiple departments or functional units across a large organization, each of which may use distinct terminology when referring to that entity.

With the depicted system components 300, a variety of different entity relationships and associated lexical mappings may be discovered. In selected embodiments, relationships between underspecified predicate terms can be discovered in cases where the same term is used in different business areas by using the specified context for the term to map the term to an entity. For example, billing department documents will frequently use the term "Inquiry" which, in this context, refers to a billing inquiry which is received from an "account" that is a businesses that purchased the company's products. However, a technical support department documents may also use the term "Inquiry" which, in this context, is typically made by people or actual users using the service who are following up on an outage report. When these documents are ingested and a conventional relationship generalization process runs against them, the frame extraction may not be able to formulate any reliable conclusion at all since the arguments to "Inquiry" vary. To address this, the depicted system components 300 may implement a two-phase method which first creates relationship clusters for the billing documents before mapping those relationships across sub-domains to the clusters formed from technical support documents.

In other embodiments, the depicted system components 300 may be used to discover entity relationships when different guises are used for the same entity. For example, the billing department may have an entity type "company" that contains a certain inventory of tokens, while the technical support department may have an entity type called "reporting account" that contains a subset of the same tokens. To discover this connection, the depicted system components 300 may implement a clustering method to discover that those entity fields refer to the same entity. Once such mappings are known, cross-links between entities in different clusters can be used to spread the weights of other relationships or for similar calculations that were previously unsupported.

The depicted system components 300 may also be used to discover entity relationships by linking entities across different business silos when business entities participate in different relationships within various phases of their engagement with the enterprise. For example, attributes appropriate for one phase, such as creditworthiness calculations, do not necessarily propagate to the models of other business silos, yet analytic conclusions that cross functional boundaries within the business may benefit from chaining together the relations of the entity in a sequence of phases. To make this connection, the depicted system components 300 may be used to develop both within-cluster links and cross-cluster links between entities in different business silos.

The depicted system components 300 may also be used to discover entity relationships by performing context mapping for each entity by identifying or inferring context information from a business silo and storing the additional context information with a special relationship. For example, an "Inquiry" term will have a context of account in case of "Billing," but will have a context of "Order Management" in case of customer order. To perform this context mapping, the depicted system components 300 may be used to map additional context information for each entity.

To provide additional details for an improved understanding of selected embodiments of the present disclosure, reference is now made to FIG. 4 which depicts a component diagram 400 of various system components and processing steps for extracting entity relationship information across corpora. The processing shown in FIG. 4 is performed by a cognitive system 100, such as an IBM Watson™ QA system or other natural language question answering system shown in FIG. 1, discovering entity relationships in structured, semi-structured, and/or unstructured content stored in the knowledge corpora 106 from different industry domains that are used to answer a question request (e.g., question 10) presented to the cognitive system 100.

To identify entity relationships in the different industry domains, the cognitive system 100 first discovers entity relationships by extracting named entity and related entity information from different clusters or business silos. In selected example embodiments, the entity relationships may be discovered by using system components 300 (such as shown in FIG. 3) to assign weights to dictionary vocabulary lexicon based on domain dictionary corpus and context dictionary corpus. The processing to extract entity relationships may be performed at the entity extraction process 11 (FIG. 1) or other NLP routine. In selected embodiments, the extracted entity information may be named entities 401-404, such as a first entity E1="Order Status" 401, a second entity E2="Customer" 402, a third entity E3="Incidents" 403, or a fourth entity E4="Service" 404. Stated more generally, the extracted named entities may be referred to as identifies $E_i \ldots E_n$.

Using the extracted entity relationship information ($E_i \ldots E_n$), the cognitive system 100 identifies and assigns related entities to a specific business silo or cluster 411-413, as indicated by the assignment step 410. The processing to identify and assign related entities to specific clusters or business silos 411-413 may be performed at the assignment process 12 (FIG. 1) or other NLP routine. For example, a plurality of business silos ($B_1 \ldots B_M$) may be defined, such as a first "Order" business silo or cluster $B_1$ 411, a second "Inquiry" business silo or cluster $B_2$ 412, or a third "Billing" business silo or cluster $B_3$ 413. With the defined business silos ($B_1 \ldots B_M$), the first "Order Status" entity E1 401 may be assigned to the "Order" and "Inquiry" business silos 411-412. In addition, the second "Customer" entity E2 402 may be assigned to the "Order," "Inquiry," and "Billing" business silos 411-413. Similarly, the third "Incidents" entity E3 403 may be assigned to the "Inquiry" business silo 412, and the fourth "Service" entity E4 404 may be assigned to the "Inquiry" and "Billing" business silos 412-413.

Once the extracted entities ($E_i \ldots E_n$) are assigned to the different business silos or clusters ($B_1 \ldots B_M$), the cognitive system 100 processes the entities in each silo/cluster by performing semantic analysis to extract shallow and/or deep relationships with entities in other silos or clusters and assign corresponding relationship scores. The entity processing may be performed at the relationship discovery and scoring process 13 (FIG. 1) or other NLP routine. For each entity (e.g., E1, E2, . . . ) in a specified silo or cluster (e.g., $B_1$), the entity processing module 420 extracts and identifies one or more associated entities (e.g., E1) in an adjacent silo or cluster (e.g., $B_2$) by searching the data corpus 422 to extract a shallow relationship (e.g., $R_L$ 414) with sentences containing the associated entities (e.g., E1 from cluster $B_1$ and E1 from cluster $B_2$). In the next silo or cluster (e.g., $B_2$), the process is repeated for each entity (e.g., E2) by the entity processing module 420 which extracts and identifies one or more associated entities (e.g., E4) in an adjacent silo or cluster (e.g., $B_M$) by searching the data corpus 422 to extract a shallow relationship (e.g., $R_2$ 415) with sentences containing the associated entities (e.g., E1 from cluster $B_2$ and E4 from cluster $B_M$). Stated more generally, the entity processing module 420 may include a shallow relationship extractor which processes each selected entity $E_i$ from a first silo or cluster ($B_J$) to extract and associate entity information $E_i$ through $E_n$ from an adjacent silo or cluster ($B_{J+1}$) by searching the data corpus 422 to extract shallow relationships ($R_k$) with sentences containing the selected entity $E_i$ from the first silo or cluster ($B_J$) and the associated entity $E_i$ from an adjacent silo or cluster ($B_{J+1}$). At the entity processing module 420, each extracted shallow relationship ($R_k$) may be assigned a first relationship score (e.g., Score1).

In addition or in the alternative, the entity processing module 420 may perform a similar silo-based processing of entities to extract deep relationship information for related entities in different silos or clusters. To this end, the entity processing module 420 may include a deep relationship extractor for processing each entity (e.g., E1, E2, . . . ) in a specified silo or cluster (e.g., $B_1$) by searching the data corpus 422 to perform deep syntactic and semantic analysis on extracted passages. Based on the results of the deep relationship extraction, the entity processing module 420 may assign a second relationship score (e.g., Score2) to each extracted deep relationship, such as by using an inverse-document-frequency (IDF) or Passage Score techniques. Stated more generally, the entity processing module 420 may use any desired relationship extraction process to identify and score entity relationships across the different business silos or clusters ($B_1 \ldots B_M$).

Once the individual entity relationships are identified and scored, a list of normalized scores 424 is generated by the entity processing module 420. To generate the list of normalized scores 424, a normalized score $S_K$ is computed for each identified entity relationship $R_K$, and the resulting list 424 may include pairings of $R_1:S_1$, $R_2:S_2$, $R_3:S_3$, etc.

To filter out weakly linked entity relationship information, the list of normalized scores 424 may be processed by the filter module 426 which applies one or more threshold criteria. For example, the filter module 426 may be configured to evaluate each of the normalized scores $S_K$ against a specified score threshold (e.g., 0.75 or 0.8) so that only entity relationships having normalized scores that meet or exceed the specified score threshold are included in a list of related clusters 428. From the assembled list 428, a model of the cluster relationships may be constructed, serialized, and stored in the cluster relationship database 430. In this way, the computed relationship scores (e.g., Score1, Score2, etc.) may be used to determine the degree of relationship between entities in different clusters or silos. And if the degree of relationship meets a threshold requirement, then the resulting cluster relationships (e.g., cluster $B_1$ is related to cluster $B_2$, cluster $B_2$ is related to cluster $B_5$, cluster $B_1$ is related to cluster $B_7$, etc.) may be captured in the cluster relationship model 430.

To provide additional details for an improved understanding of selected embodiments of the present disclosure, reference is now made to FIG. 5 which depicts a simplified flow chart 500 showing the logic for deducing entity relationships across different knowledge databases or corpora using cluster-based dictionary vocabulary lexicon which are weighted or scored. The processing shown in FIG. 5 may be performed by a cognitive system, such as an IBM Watson™ QA system or other natural language question answering system shown in FIG. 1, when ingesting structured, semi-structured, and/or unstructured content in business documents contained in a plurality of knowledge databases from different industry domains. FIG. 5 processing commences at 501 whereupon, at step 502, the process extracts named entities, relationships, and co-references from the business documents. The processing at step 502 may be performed at the QA system 100 by the en extraction process 11 or other NLP question answering system. As described herein, a Natural Language Processing (NLP) routine may be used to perform entity extraction processing on the business documents, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input.

At step 503, the extracted entity information is assigned to one or more clusters or business silos. The processing at step 503 may be performed at the QA system 100 by the assignment process 12 or other NLP question answering system. As described herein, the assignment process may classify or assign each of the extracted entities ($E_i \ldots E_n$) to one or more business silos or clusters ($B_1 \ldots B_M$). As a result of the assignment processing step 503, each silo or cluster may include information identifying one or more of the extracted entities.

At step 504, each entity (e.g., $E_i$) in a given cluster (e.g., $B_j$) is processed to extract entity relationships with other entities (e.g., $E_i$-$E_n$) in an adjacent cluster (e.g., $B_{j+1}$). The processing at step 504 may be performed at the QA system 100 by the relationship discovery and scoring process 13 or other NLP question answering system. As described herein, the relationship extraction process proceeds through each entity in the current cluster (e.g., $B_j$) by using the a negative outcome from detection step 505 to increment the cluster count (step 506) until the last cluster is reached, as indicated by an affirmative outcome to detection step 505.

At step 508, the extracted relationship information for all entities in all clusters is processed to extract shallow relationship information ($SR_K$). The processing at step 508 may be performed at the QA system 100 by the relationship discovery and scoring process 13 or other NLP question answering system which searches the data corpus for sentences containing the related entity information. Based on the results of the corpus search at step 508, a first score is assigned to each identified shallow relationship using any desire scoring technique.

At step 510, the extracted relationship information for all entities in all clusters is processed to extract deep relationship information ($DR_K$). The processing at step 510 may be performed at the QA system 100 by the relationship discovery and scoring process 13 or other NLP question answering system which performs deep syntactic and semantic analysis on extracted passages from the data corpus containing the related entity information. Based on the results of the corpus search at step 510, a second score is assigned to each identified deep relationship using any desire scoring technique.

At step 512, the first and second scores for the shallow and deep relationships are used to compute a list of normalized scores ($S_K$) is computed for each identified entity relationship ($R_K$). The processing at step 512 may be performed at the QA system 100 by the relationship discovery and scoring process 13 or other NLP question answering system which may generate a list of entity relationships paired with their corresponding normalized scores (e.g., $R_1:S_1$, $R_2:S_2$, $R_3:S_3$, etc.).

At step 514, the list of normalized scores may be filtered or ranked against one or more threshold criteria. The processing at step 514 may be performed at the QA system 100 by the relationship discovery and scoring process 13 or other NLP question answering system which applies a threshold test to the normalized scores ($S_K$) to filter out weakly linked entity relationship information. In this way, a list of related clusters may be created for each entity relationship whose normalized score passes the threshold test.

At step 516, the assembled list of related dusters is used to construct a model of the cluster relationships. The processing at step 516 may be performed at the QA system 100 by the relationship discovery and scoring process 13 or other NLP question answering system which may serialize the assembled list of related clusters and store this as a model of the cluster relationships in a cluster relationship database.

By now, it will he appreciated that there is disclosed herein a system, method, apparatus, and computer program product for identifying, with an information handling system having a processor and a memory, cluster relationships for searching across different corpora based on word classifications extracted from business documents stored in a plurality of corpora, where the business documents may he billing, customer orders, procedures, dealers, customer correspondence, credit, incidence, and/or service documents. As disclosed, the system, method, apparatus, and computer program product identify a plurality of different cluster classifications for business documents stored in the plurality of corpora, where each cluster classification corresponds to a different corpora. In addition, entity information from the business documents is classified into the plurality of different cluster classifications. The classification step may include performing natural language processing (NLP) analysis of the business documents to extract named entity information from the business documents. In other embodiments, the entity information may be classified by extracting named entities, terms, contexts, and concepts from the business documents, and then assigning the named entities, terms, contexts, and concepts to at least one of the plurality of different cluster classifications. By applying semantic analysis, such as shallow and deep semantic analysis methods, to the classified entity information, entity relationships are identified between entity information classified in the different cluster classifications. In addition, one or more scores are determined or computed for each identified entity relationship. The scoring process may include applying a normalized weighting algorithm to the one or more scores to generated normalized scores for each identified entity relationship. After applying a threshold test to the (normalized) scores to identify each entity relationship having a normalized score that meets or exceeds the threshold test, the resulting scores (e.g., the normalized scores that meet or exceed the threshold test) may then be used to identify a cluster relationship between at least two cluster classifications, and a model may be constructed of each identified cluster relationship between the at least two cluster classifications. Based on the identified cluster relationship, the information handling system may search first and second corpora corresponding to the cluster classifications having the identified cluster relationship, thereby expanding the corpora search capabilities to include related corpora.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of identifying cluster relationships for searching across a plurality of corpora, the method comprising:

identifying, by the system, a plurality of different cluster classifications for a corresponding plurality of corpora;

classifying, by the system, entity information from documents stored in the plurality of corpora into the plurality of different cluster classifications by extracting named entities, terms, contexts, and concepts from the documents, and assigning the named entities, terms, contexts, and concepts to at least one of the plurality of different cluster classifications;

applying semantic analysis, by the system, to identify entity relationships between entity information classified in the plurality of different cluster classifications by applying shallow and deep semantic analysis methods to identify entity relationships between the plurality of different cluster classifications;

determining, by the system, one or more scores for each identified entity relationship;

identifying, by the system, a cluster relationship between at least two cluster classifications based on the one or more scores for each identified entity relationship; and searching, by the information handling system, at least first and second corpora corresponding to the at least two cluster classifications having the identified cluster relationship.

2. The method of claim 1, wherein classifying entity information from the documents comprises performing, by the system, a natural language processing (NLP) analysis of the documents, wherein the NLP analysis extracts named entity information from the documents.

3. The method of claim 1, wherein the documents are selected from a group comprising billing, customer orders, procedures, dealers, customer correspondence, credit, incidence, and service documents.

4. The method of claim 1, wherein determining one or more scores comprises applying a normalized weighting algorithm to the one or more scores to generate normalized scores for each identified entity relationship.

5. The method of claim 4, further comprising applying a threshold test to the normalized scores to identify each entity relationship having a normalized score that meets or exceeds the threshold test.

6. The method of claim 5, further comprising constructing a model which specifies cluster relationships within the plurality of different cluster classifications.

* * * * *